A. BRADFORD.
Indicator for Electric Burglar Alarm.

No. 232,591. Patented Sept. 28, 1880.

WITNESSES
E. J. Nottingham
A. W. Bright

INVENTOR
Addison Bradford
By H. A. Symons
ATTORNEY

UNITED STATES PATENT OFFICE.

ADDISON BRADFORD, OF SARATOGA SPRINGS, NEW YORK.

INDICATOR FOR ELECTRIC BURGLAR-ALARMS.

SPECIFICATION forming part of Letters Patent No. 232,591, dated September 28, 1880.

Application filed January 22, 1880.

*To all whom it may concern:*

Be it known that I, ADDISON BRADFORD, of Saratoga Springs, in the county of Saratoga and State of New-York, have invented certain new and useful Improvements in Indicators for Electric Burglar-Alarms; and I do hereby declare the following to be a full, clear, and exact description of the invention, such as will enable others skilled in the art to which it pertains to make and use it, reference being had to the accompanying drawings, which form part of this specification.

My invention relates to an improvement in indicators for electric burglar-alarms.

Heretofore electric burglar-alarms have been provided with indicators of such construction that whenever the alarm is sounded it necessitates a separate and independent manipulation of each knob or attachment connected with the indicator to ascertain the point at which the circuit has been closed, which denotes the location of the attempted entrance of the building by burglars. This form of indicator is objectionable for the reason that it is complicated in structure and requires an undue waste of time for its operation.

The object of my invention is to provide an indicator for electric burglar-alarms of such construction that a single continuous movement of the indicator-pointer will serve to break the several circuits connecting with the indicator and designate on the indicating apparatus the particular locality at which the opening in the dwelling or building has been effected or attempted; and to this end my invention consists, first, in an indicator for electric burglar-alarms, the combination, with the several circuits connected with a single metal strip, disk, or plate, of a pointer or equivalent device adapted to be revolved or moved to register with the dials, knobs, or disks of the indicator, and a circuit-breaker connected with said pointer or device and adapted to be moved in unison therewith, the parts being so arranged that the several circuits may be broken by a single continuous movement of the pointer or other device, and when the circuit which has been closed by the attempted or actual entrance of the building is broken the pointer will correctly designate on the indicator the particular locality of the burglar's operation or attempted intrusion.

My invention further consists in the several features of construction and combinations of parts, as will hereinafter be described, and pointed out in the claims.

Figure 1:
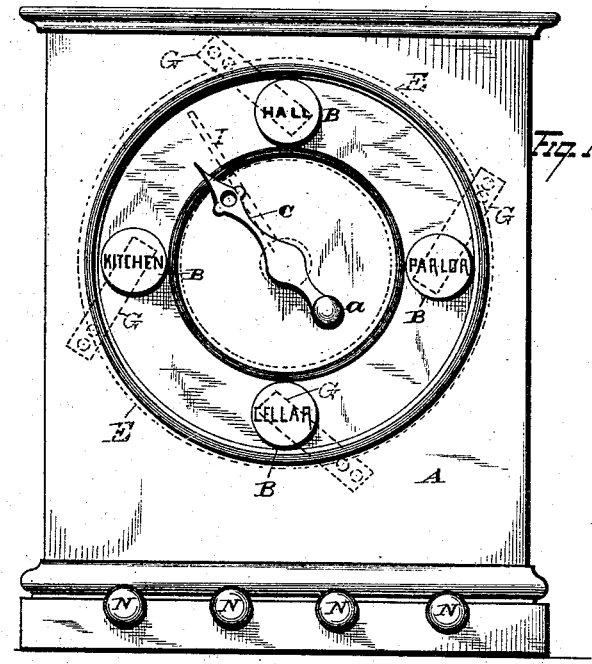
Figure 2:
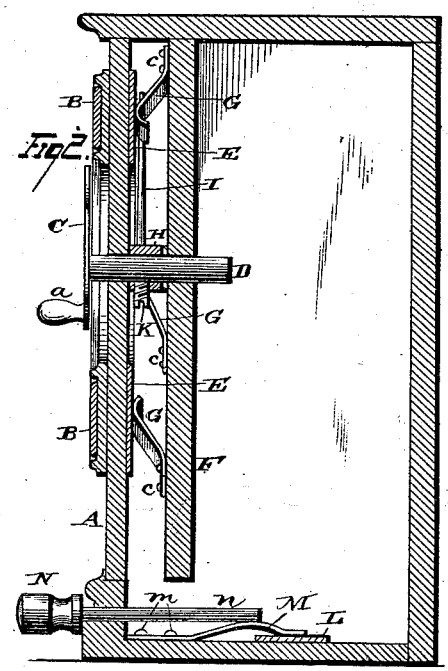
Figure 3:
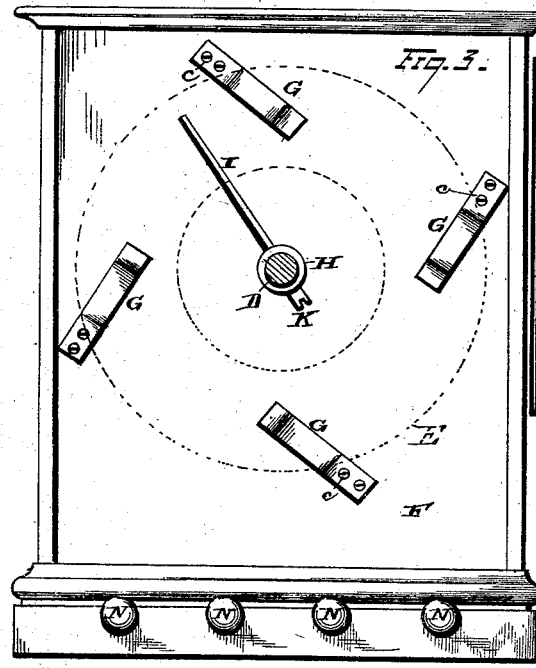
Figure 4:
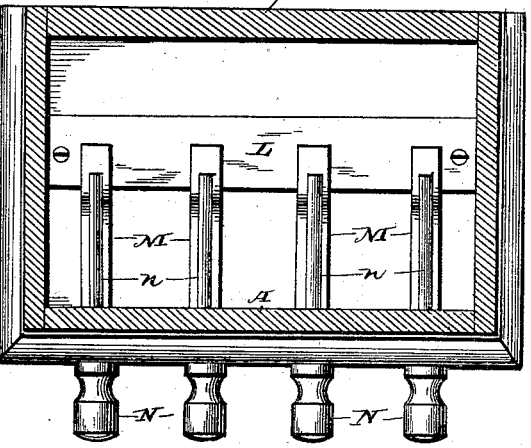
Figure 5:
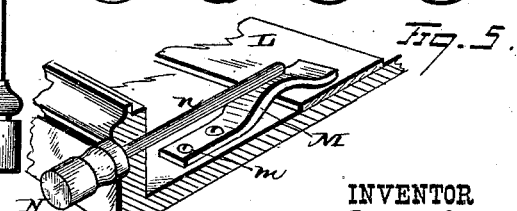

In the accompanying drawings, Figure 1 is a view, in front elevation, of my improvement in indicators for electric burglar-alarms. Fig. 2 is a vertical section through the central portion of the indicator removed. Fig. 3 is a view with the front of the indicator removed, showing the spring circuit-closers in elevation. Fig. 4 is a plan view of the devices employed for placing any one or more circuits in or out of connection with the indicator; and Fig. 5 is a view, in perspective, of the last-mentioned device.

A represents the front of an indicator, having any desired number of lettered or numbered disks, tablets, or knobs, B, suitably secured thereto.

C is a pointer rigidly secured to the end of a shaft, D, said pointer being provided with a handle, $a$, for rotating the same.

To the rear surface of the front of the indicator-frame is secured an annular metal plate, E, while to the partition F the spring-metal circuit-closers G are suitably attached, there being as many circuit-closers G employed as there are lettered or numbered disks on the indicator, one of said circuit-closers being located directly back of each one of the lettered disks or buttons.

The separate wires composing the different and independent circuits to different portions of the building are each connected with the spring-metal circuit-closer located adjacent to the lettered disk denoting the point with which the circuit connects, the wires being attached to suitable binding-posts, or to screws $c$, by which the circuit-closers are fastened to partition F.

Upon shaft D is placed a sleeve, H, to which is attached a circuit-breaker, I, the latter consisting of an arm of sufficient length to engage with the free or outer ends of the spring-metal circuit-closers G, the arm I being located at a sufficient distance from the annular metal plate E so that when it is rotated it will operate to force the circuit-closer G away from and out of contact with said metal plate E, and thus break the electric circuit. The sleeve H, to which the circuit-breaker is secured, is provided with a set-screw, K, or equivalent device, in order to allow of the proper adjustment of the arm or circuit-breaker I, it being necessary that said arm or circuit-breaker should be secured in such relative adjustment with respect to the position of the pointer C that when the latter points to one of the lettered or numbered disks or buttons on the indicator the circuit-breaker will have forced the circuit-closer corresponding with such particular disk and have broken the circuit connecting therewith or represented thereby.

The operation of the device is as follows: When the indicator is not in use the pointer is moved to a point between two of the lettered disks, thus allowing all the circuits to remain closed. Should any of the windows or doors having electric connection with the indicator be opened the complete circuit with the battery-alarm and through the indicator would be closed, thus sounding the alarm.

To ascertain at what particular place in the building an entrance has been attempted or effected, it is simply necessary to impart a continuous rotary movement to the pointer, and the several circuit-closers are thus opened in succession until the circuit which has been closed by the attempted entrance is opened, when the alarm ceases its operation and the pointer indicates the locality of the disturbance.

It is sometimes desirable to provide one portion of the building with the electric connection and leave a remaining portion unprotected. The following provision is made for this purpose: In the lower portion of the indicator case or cabinet is secured a metal strip, L, upon which rest the free ends of the several spring circuit-closers M, which correspond in number to the number of independent circuits throughout the building. The wires of the several circuits are attached to binding posts or screws m, which serve to secure the circuit-closers in place. Knobs N, having pins n attached thereto, are inserted through the indicator-case, and operate to press the free ends of the circuit-closers in close contact with the metal plate L.

By pulling out one of the stops it operates to release the spring-metal circuit-closer, allowing its free end to rise from contact with the metal plate, and thus break the circuit and remain unaffected. The knobs are lettered or numbered to indicate the particular locality with which the circuit corresponding thereto connects in the building.

It is evident that many slight changes in the construction and arrangement of the several parts or devices of my improved indicator might be resorted to without departing from the spirit of my invention—as, for instance, the arm or circuit-breaker might be rigidly secured to the shaft and the handle or pointer adjustably secured to the outer end of the shaft. Again, the annular metal plate might be secured to the partition and the springs to the rear surface of the front of the case; or, instead of employing an annular metal plate, springs might be employed, connection being made between the several springs by a wire or metal ring. Again, instead of breaking the several circuits by a rotary circuit-breaker, the same result could be effected by a reciprocating movement, in which case a bar of any shape in cross-section, and provided with words or numbers indicating the different circuits throughout the building, could be used. By drawing out the bar from any portion of the indicator-case the circuit that had been closed by an attempted intrusion is broken, and the last-exposed name or number on the bar would indicate the point of operation or attack.

The connection between the reciprocating bar could be made by springs or switches, or in a variety of ways. Hence I would have it understood that I do not restrict myself to the exact construction and arrangement of parts shown and described; but, Having fully described my invention, what I claim as new, and desire to secure by Letters Patent, is—

1. In an indicator for electric burglar-alarms, the combination, with a metal strip, disk, or plate, of the several electric circuits and spring-metal circuit-closers connecting the several circuits with said metal plate, and a circuit-breaker arranged and adapted to break all the several circuits by a single continuous movement thereof, substantially as set forth.

2. In an indicator for electric burglar-alarms, the combination, with an annular metal plate and spring-metal circuit-closers, the latter having the several circuits connected therewith, of a rotatory circuit-breaker and a pointer, both of which are attached to a revolving shaft, substantially as set forth.

3. In an indicator for electric burglar-alarms, the combination, with a metal strip, disk, or plate, a series of spring-metal circuit-closers connecting the several circuits with said metal strip, plate, or disk, and a circuit-breaker arranged to break all the several circuits by a single continuous movement thereof, of a separate and independent series of spring-metal circuit-closers and adjustable pins for throwing any desired number of said circuits either in or out of connection with the indicator, substantially as set forth.

4. In an indicator for electric alarms, the combination, with a series of spring-metal circuit-closers and a circuit-breaker for breaking all the several circuits by a single continuous movement, of a pointer provided with a handle and a series of lettered or numbered disks or knobs arranged on the front of the indicator-case, substantially as set forth.

In testimony that I claim the foregoing I have hereunto set my hand this 13th day of January, 1880.

ADDISON BRADFORD.

Witnesses:
E. H. PETERS,
M. S. CUMMINGS.